(12) United States Patent
Jacobs (10) Patent No.: US 10,367,367 B1
(45) Date of Patent: Jul. 30, 2019

(54) ELECTRONIC WATCH RECHARGING DEVICE

(71) Applicant: Keith A. Jacobs, Terrace (CA)

(72) Inventor: Keith A. Jacobs, Terrace (CA)

( * ) Notice: Subject to any disclaimer, the term of this patent is extended or adjusted under 35 U.S.C. 154(b) by 197 days.

(21) Appl. No.: 15/392,366

(22) Filed: Dec. 28, 2016

Related U.S. Application Data (60) Provisional application No. 62/271,382, filed on Dec. 28, 2015.

(51) Int. Cl.
*H02J 7/02* (2016.01)
*H02J 50/10* (2016.01)
*G04G 19/00* (2006.01)

(52) U.S. Cl.
CPC .............. *H02J 7/025* (2013.01); *G04G 19/00* (2013.01); *H02J 50/10* (2016.02)

(58) Field of Classification Search
CPC ...................................................... H02J 7/025
USPC ....................................................... 307/104
See application file for complete search history.

(56) References Cited

U.S. PATENT DOCUMENTS

| 7,948,208 | B2 | 5/2011 | Partovi et al. |
| 7,957,804 | B2 | 6/2011 | Abreu |
| 8,026,693 | B2 | 9/2011 | Burley |
| 8,373,387 | B2 | 2/2013 | Bourilkov et al. |
| 2005/0143140 | A1 | 6/2005 | Sanders et al. |
| 2011/0227527 | A1 | 9/2011 | Zhu et al. |
| 2012/0086394 | A1 | 4/2012 | Hui |
| 2012/0181855 | A1 | 7/2012 | Hunt et al. |
| 2015/0022141 | A1* | 1/2015 | Oku ................ H02J 7/0029 320/107 |
| 2016/0294133 | A1* | 10/2016 | Xie .................... H01R 27/02 |
| 2017/0093198 | A1* | 3/2017 | Graham ............. H02J 7/025 |

* cited by examiner

*Primary Examiner* — Joseph Chang
(74) *Attorney, Agent, or Firm* — Cramer Patent & Design PLLC; Aaron R Cramer (57) ABSTRACT

An electronic watch charging device includes a body, a charging assembly configured to engage and inductively charge an electronic watch, and an adapter mechanically coupled to the body and electrically coupled to the charging assembly receptacle, the adapter being configured to be coupled to a power supply.

19 Claims, 5 Drawing Sheets

ELECTRONIC WATCH RECHARGING DEVICE

RELATED APPLICATIONS

The present invention was first described in and claims the benefit of U.S. Provisional Application No. 62/271,382, filed Dec. 28, 2015, the entire disclosures of which are incorporated herein by reference.

FIELD OF THE INVENTION

The present invention relates generally to portable electronics and, more particularly, to an electronic watch charging device.

BACKGROUND OF THE INVENTION

In today's modern society, portable electronic devices are used by most people numerous times during the day. One (1) disadvantage of frequent, regular use is that most portable electronic devices require additional charging cycles during the day due to power consumption and limited battery life. This can often prove to be difficult when the user is traveling and does not have access to a standard (e.g., 110-VAC) power outlet to charge the portable electronic device.

There are various types of portable chargers for portable electronic devices. Some types of portable chargers use a universal serial bus (USB) connector for connection to the portable electronic device. Other types of portable charges use magnetic induction to charge the portable electronic device. Today, most vehicles include USB-type connections to allow a user to charge or power a portable electronic device while driving. Older models of vehicle include a 12-VDC socket (i.e., cigarette lighter port) that can be used in combination with an adapter to allow a user to charge or power a portable electronic device while driving.

One (1) type of portable electronic device that has gained in popularity is the wearable device, such as an electronic watch (e.g., a smartwatch). Electronic watches generally have similar capabilities to a smart phone or tablet computer, but in a much smaller package. Some users prefer to wear the electronic watch for extended periods, including during sleep due to the ability of the electronic watch to track sleep patterns and serve as an alarm. This continuous use often requires the electronic watch to be charged more frequently.

One (1) limitation with the small size of the electronic watch is that most electronic watches are required to be charged by induction because a USB port would be too large and may increase the overall size of the watch. One (1) limitation with the induction charging devices for electronic watches is that the watch must sit on or hang from the charger and is generally coupled to the charger with a weak magnet. This weak magnet is often not strong enough to hold an electronic phone on the induction charger while in a moving vehicle. Other types of portable chargers are available but often prove to be large, cumbersome, and not aesthetically pleasing.

Accordingly, there is a need for a charging device for electronic watches that addresses the above-identified limitations and disadvantages.

SUMMARY OF THE INVENTION

The inventor has recognized the aforementioned inherent problems and lack in the art and observed that there is a need for an electronic watch charging device. The development of the present invention, which will be described in greater detail herein, fulfills this need.

In an embodiment, the disclosed electronic watch charging device includes a body, a charging assembly configured to engage and inductively charge an electronic watch, and an adapter mechanically coupled to the body and electrically coupled to the charging assembly receptacle, the adapter being configured to be coupled to a power supply.

In another embodiment, the disclosed electronic watch charging device includes a body, a charging assembly receptacle configured to engage and inductively charge an electronic watch, a restraining strap connected to the body, the restraining strap being configured to secure the electronic watch into engagement with the charging assembly receptacle, a USB adapter interchangeably coupled to the body, the USB adapter being configured to electrically interconnect the charging assembly receptacle to a power supply when coupled to the body, an accessory port adapter interchangeably coupled to the body, the accessory port adapter being configured to electrically interconnect the charging assembly receptacle to the power supply when coupled to the body, and a standard plug adapter interchangeably coupled to the body, the standard plug adapter being configured to electrically interconnect the charging assembly receptacle to the power supply when coupled to the body.

Furthermore, the described features and advantages of the disclosure may be combined in various manners and embodiments as one skilled in the relevant art will recognize. The disclosure can be practiced without one (1) or more of the features and advantages described in a particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

FIG. 4b is a side elevation view of the USB adapter body of FIG. 4a;

FIG. 5b is a side elevation view of the accessory port adapter of FIG. 5a;

FIG. 6b is a side elevation view of the standard plug adapter of FIG. 6a;

DESCRIPTIVE KEY 10 electronic watch recharging device
11 body
12 charging receptacle
13 USB port
14 indicator light
15 restraining strap
16 induction charger
17 recess
18 charging assembly
20 USB adapter
21 USB adapter plug
22 USB adapter connector
30 accessory port adapter
31 accessory port plug
32 accessory port adapter connector
40 standard plug adapter
41 standard plug adapter plug
42 standard plug adapter connector
50 5-VDC power supply
55 12-VDC power supply
60 120-VAC power supply
65 controller circuit
70 internal rechargeable battery
72 induction charging element
74 cord
76 USB plug

DETAILED DESCRIPTION OF THE PREFERRED EMBODIMENT

In accordance with the invention, the best mode is presented in terms of example embodiments, herein depicted within FIGS. 1-9. However, the disclosure is not limited to a single described embodiment and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only one (1) particular configuration may be shown and described for purposes of clarity and disclosure and not by way of limitation of scope.

The terms "a" and "an" herein do not denote a limitation of quantity, but rather denote the presence of at least one (1) of the referenced items.

Referring to FIGS. 1-9, disclosing an electronic watch charging device, generally referred to herein as a device 10, where like reference numerals represent similar or like parts. The device 10 may be used to provide charging power to an electronic watch (not shown), also commonly referred to as a smartwatch. Generally, the device 10 includes a body 11 having an electronic watch charging assembly 18 and a plurality of charging adapters 20, 30, 40 providing an electrical connection to an external power supply (not shown).

Figure 1:
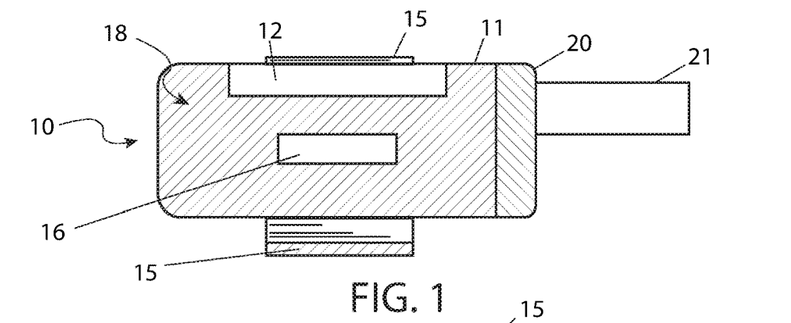
FIG. 1 is a cut-away side view of an electronic watch charging device showing a power supply connection using a USB adapter, according to an embodiment of the present invention.
Figure 2:
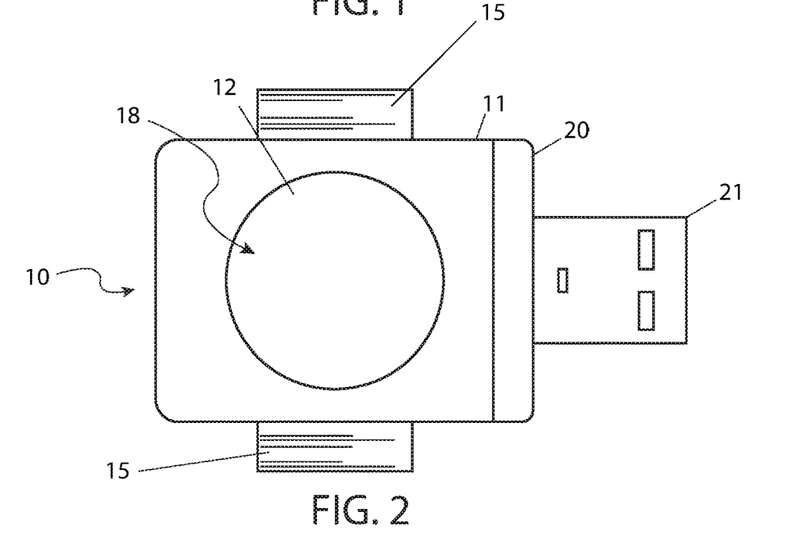
FIG. 2 is a top view of the electronic watch charging device showing a power supply connection using the USB adapter, according to an embodiment of the present invention.
Figure 3:
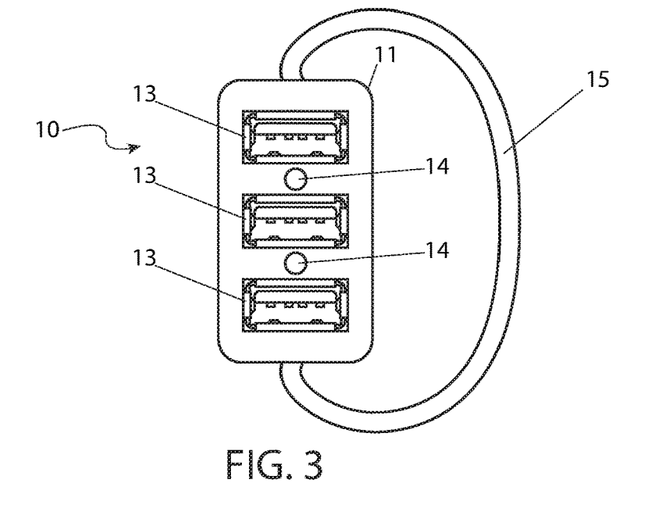
FIG. 3 is a front face side view of the electronic watch charging device, according to all embodiments of the present invention.

Referring now to FIGS. 1-3, an example embodiment of the device 10 includes a Universal Serial Bus (USB) adapter body 20 that is compatible with a USB port. As can be seen in FIGS. 1-3, the device 10 also includes the body 11 having the electronic watch charging assembly 18, also referred to herein as the charging assembly 18.

The electronic watch charging assembly 18 includes a charging receptacle 12 formed in the body 11. As an example, the charging receptacle 12 includes a recess formed (e.g., depending inwardly) in a top surface, or upper face, of the body 11. In this embodiment, the charging receptacle 12 is configured (e.g., is sized and shaped) to receive, engage and/or otherwise mate with a portion of an exterior housing of the smartwatch for charging. In this embodiment, the charging assembly 18 also includes magnetic induction charger 16 housed within the body 11 of the device 10 and is accessible when the electronic watch (not shown) is seated in, or on, the charging receptacle 12 located on the upper face of the body 11. Accordingly, in this embodiment, the induction charger 16 of the charging assembly 18 is located on the interior of the body 11. Once seated therein, the electronic watch is in electrical communication with the charging assembly.

Generally, the charging assembly uses a magnetic field to transfer electricity allowing the electronic watch to receive power through an induced current rather than using conductive wires and cords. Inductive charging is a method by which a magnetic field transfers electricity from an induction charging element to the electronic watch without the use of standard wiring. Inductive charging uses the induction charger 16 to send energy through an inductive coupling to the electronic watch, which can then use that energy to charge batteries or run the electronic watch. As an example, the induction charger 16 may use an induction coil positioned beneath the charging receptacle 12 to create an alternating electromagnetic field and create a current in the electronic watch from within the body 11, housing the induction charger 16. A second induction coil in the electronic watch (not shown) takes power from the electromagnetic field and converts it back into electrical current to charge the battery. The two (2) induction coils in proximity combine to form an electrical transformer. The specific components and various possible configurations of the induction charger 16 are known to those of ordinary skill in the art and, therefore, will not be described in further detail.

A restraining strap 15 is provided secure the electronic watch to the body 11 in contact with the charging assembly 18 (e.g., positioned within the charging receptacle 12 above and in proximity to the induction charger 16) to aid in the retention of the electrical communication between the electronic watch and the charging assembly 18. It is envisioned that the restraining strap 15 is of the elastic variety to easily accommodate electronic watches of various sizes and thicknesses. However, other types of restraining straps 15, such as a hook-and-loop-type fastener, snaps, clips, or the like could also be utilized in an equally effective manner, and as such, the use of any particular type of restraining strap 15 should not be interpreted as limiting scope. The use of the retraining strap 15 is envisioned as beneficial during use in a motor vehicle while the vehicle is in motion, or when the electronic watch charging system 10 is used in an angled or non-horizontal orientation.

Referring now to FIG. 3, in an example embodiment, the body 11 includes a plurality of female USB ports 13 located on the front face, such that a user may connect other USB compatible devices into the device 10. At least one (1) indicator light 14 is present on the front face to indicate that power is being directed to the USB ports 13. The rear face of the body 11 enables one (1) of the disclosed adapters 20, 30, 40 (FIGS. 4a, 4b, 5a, 5b, 6a, 6c) to be removably connected to the device 10, thereby providing a mechanical and electrical connection between the charging assembly 18 and the adapter 20, 30, 40.

Figure 4A:
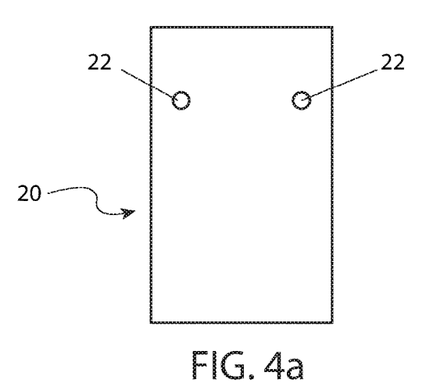
FIG. 4a is a front face side view of the USB adapter, according to an embodiment of the present invention.
Figure 4B:
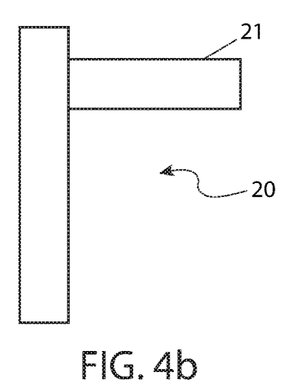

Referring to FIGS. 4a and 4b, an example embodiment of the USB adapter 20 is shown. The USB adapter 20 includes a male USB adapter plug 21 enabling connection with a corresponding female USB port (not shown) of a power supply. The USB adapter 20 also includes a USB adapter connector 22 enabling mechanical and electrical communication with the device 10, for example, to provide electrical power to the device 10 (e.g., to the charging assembly 18 and, more specifically the induction charger 16).

Figure 5A:
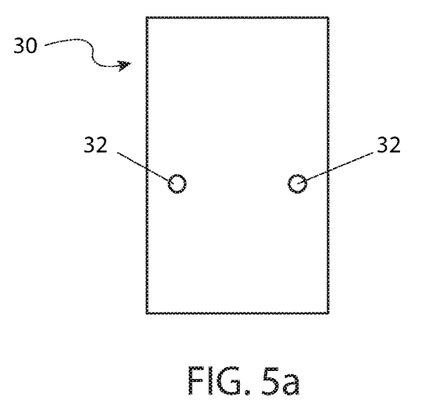
FIG. 5a is a front face side view of the accessory port adapter, according to an embodiment of the present invention.
Figure 5B:
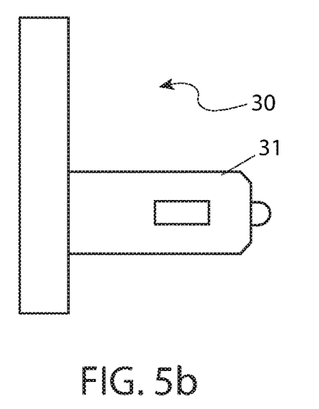

Referring to FIGS. 5a and 5b, an example embodiment of an accessory port adapter 30 is shown. The accessory port adapter 30 includes a male accessory port adapter plug 31 enabling connection with a corresponding 12 VDC (e.g., cigarette lighter-style) socket (not shown) of a power supply. The accessory port adapter 30 also includes an accessory port adapter connector 32 enabling mechanical and electrical communication with the device 10, for example, to provide electrical power to the device 10 (e.g., to the charging assembly 18 and, more specifically the induction charger 16).

Figure 6A:
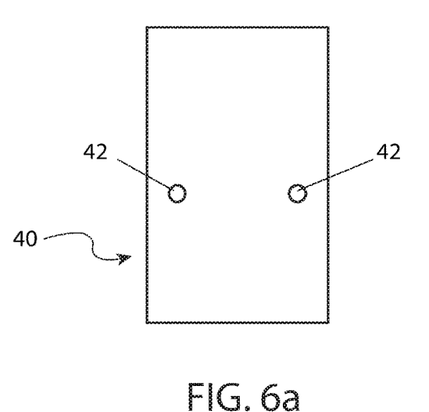
FIG. 6a is a front face side view of the standard plug adapter, according to an embodiment of the present invention.
Figure 6B:
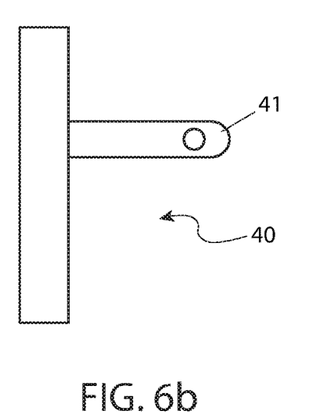

Referring to FIGS. 6a and 6b, an example embodiment of a standard plug adapter 40 is shown. The standard plug adapter 40 includes a male standard plug adapter plug 41 enabling connection with a corresponding conventional AC receptacle (not shown) of a power supply. The standard plug adapter 40 also includes a standard plug adapter connector 42 enabling mechanical and electrical communication with the device 10, for example, to provide electrical power to the device 10 (e.g., to the charging assembly 18 and, more specifically the induction charger 16).

Figure 7:
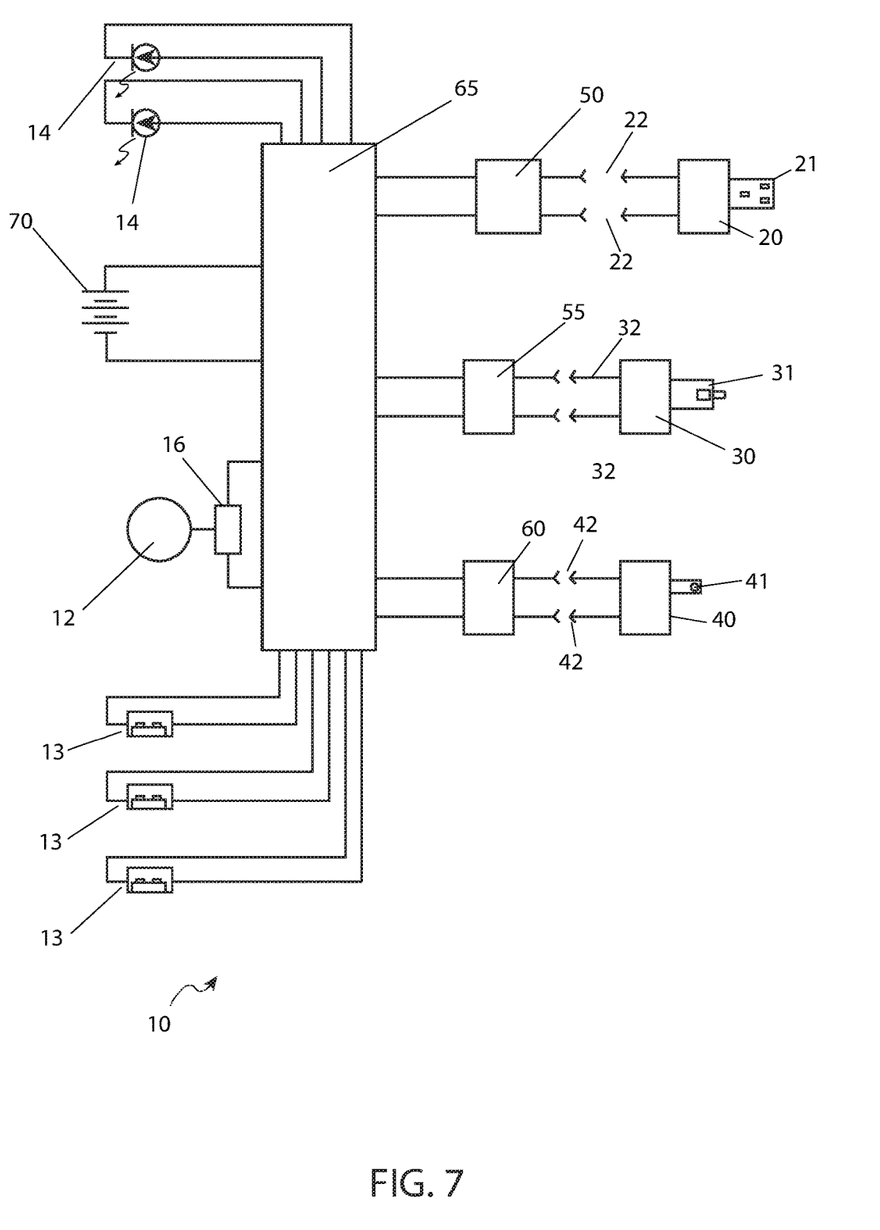
FIG. 7 is an electrical block diagram depicting major electrical components of the electronic watch charging device of FIG. 1.

Referring to FIG. 7, an electrical block diagram depicting major electrical components of the example embodiment of the device 10 shown in FIG. 1. Electrical power is obtained from one of the USB adapter 20, the accessory port adapter 30, or the standard plug adapter 40 via connection between a corresponding power supply and the USB adapter plug 21, the accessory port adapter plug 31, or the standard plug adapter plug 41, respectively. Subject power is then routed through the USB adapter connector 22, the accessory port adapter connector 32, or the standard plug adapter connector 42 as applicable.

The USB adapter connector 22 provides power to a 5-VDC power supply 50. The accessory port adapter connector 32 provides power to a 12-VDC power supply 55. The standard plug adapter connector 42 provides power to a 120-VAC power supply 60. The resultant power from the power supplies, all of the same magnitude and characteristics, enters a controller circuit 65.

The controller circuit 65 provides power to the three (3) USB ports 13 as well as the charging assembly 18 (e.g., the induction charger 16) connected directly to the controller circuit 65. In a similar manner, the controller circuit 65 provides a regulated charging current to an internal rechargeable battery 70 only when the device 10 is powered from either the USB adapter 20, the accessory port adapter 30, or the standard plug adapter 40.

In the instances where power is required by either the three (3) USB ports 13 and/or the electronic watch receptacle 12, and the electronic watch charging system 10 is not electrically connected to either the USB adapter 20, the accessory port adapter 30, or the standard plug adapter 40, the controller circuit 65 will draw power from the internal rechargeable battery 70.

Figure 8:
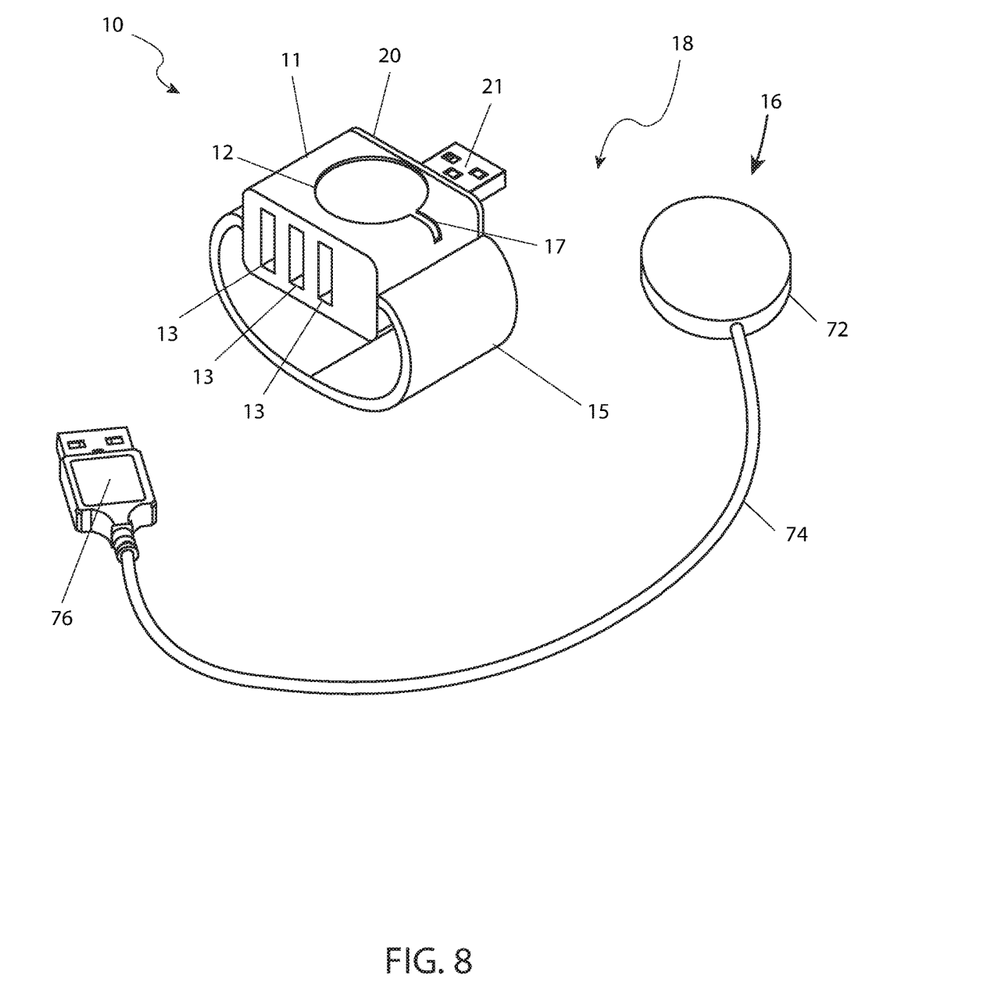
FIG. 8 is perspective view of the electronic watch charging device, according to an embodiment of the present invention; and, FIG. 9 is an electrical block diagram depicting major electrical components of the electronic watch charging device of FIG. 8.

FIG. 8 is perspective view of another embodiment of the disclosed device 10. In this embodiment, the induction charger 16 of the charging assembly 18 includes a separate induction charging cable, such as the induction charging cable that is included with or is available for the specific brand and/or model of smartwatch. Accordingly, in this embodiment, the induction charger 16 of the charging assembly 18 is located on the exterior of the body 11.

The charging receptacle 12 is configured (e.g., is sized and/or shaped) to receive, engage and/or otherwise mate with a charging element 72 of the induction charger 16 (e.g., of the induction charging cable). The induction charger 16 may also include a cord 74 extending from the induction charging element 72 and terminating at a USB plug 76. The induction charger 16 may be plugged into one of the USB ports 13, via the USB plug 76, for supplying power to the induction element 72.

The body 11 may also include a recess 17 formed in the body 11 and extending from the charging receptacle 12. The recess 17 is configured (e.g., is sized and/or shaped) to receive a portion of the cord 74 such that the induction charger 16 fits flush within the charging receptacle 12.

The smartwatch may then be placed in contact with the induction charger 16 (e.g., with the charging element 72 positioned within the charging receptacle 12 and located on the exterior of the body 11) for charging of the smartwatch. Optionally, the smartwatch may be secured into position using the strap 15.

Figure 9:
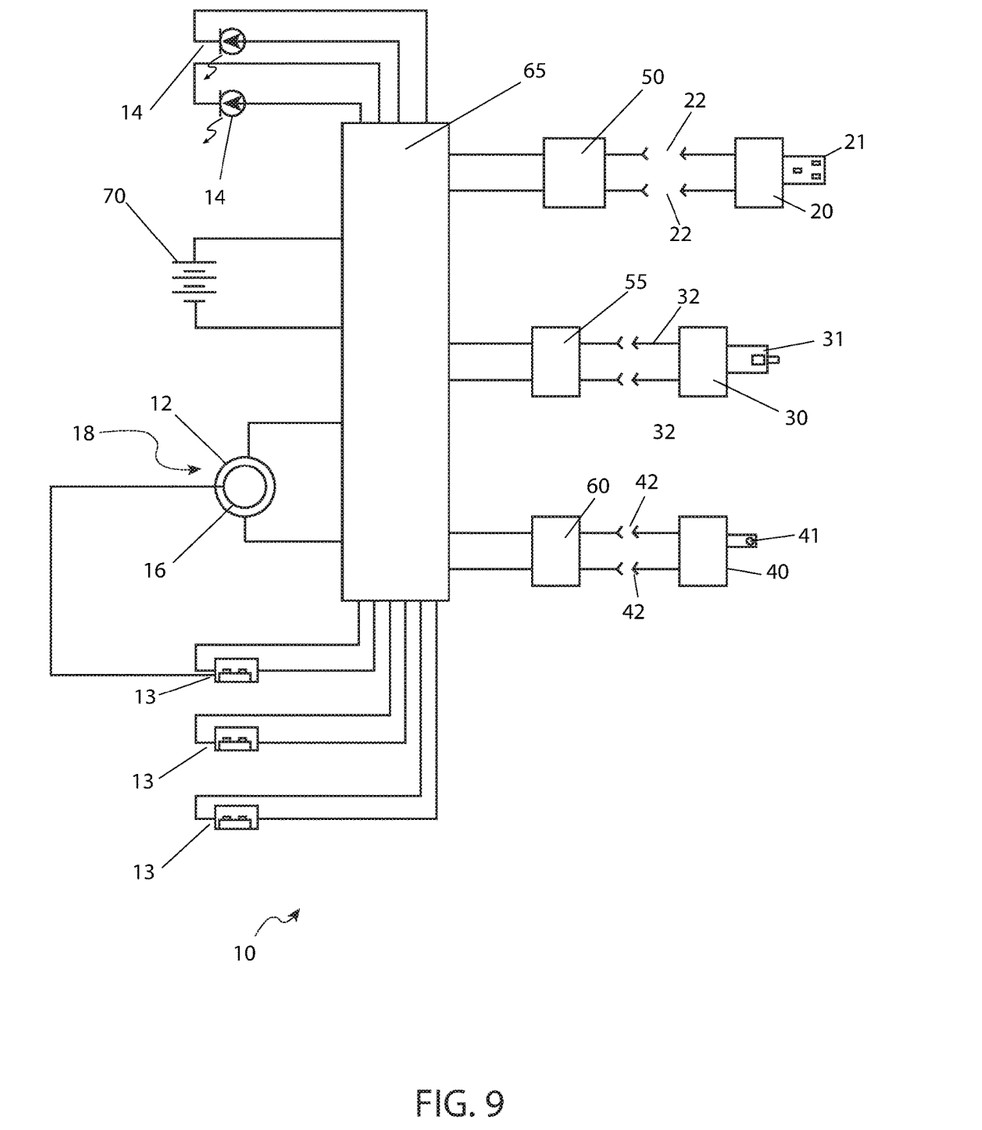

FIG. 9, an electrical block diagram depicting major electrical components of the example embodiment of the device 10 shown in FIG. 8. In this embodiment, the controller circuit 65 provides power to the three (3) USB ports 13 as well as the charging assembly 18 (e.g., the induction charger 16) connected to one (1) of the USB ports 13. In a similar manner, the controller circuit 65 provides a regulated charging current to an internal rechargeable battery 70 only when the device 10 is powered from either the USB adapter 20, the accessory port adapter 30, or the standard plug adapter 40.

It is envisioned that the capacity of the internal rechargeable battery 70 will be approximately two hundred fifty milliamp hours (250 mAh) allowing for one (1) complete recharge of a standard smart watch connected via the electronic watch receptacle 12. However, battery capacities of other sizes could be utilized in an equally effective manner to allow for additional recharge cycles, and as such, the use of any particular battery capacity is not intended to be limiting in scope. In such a manner, the device 10 can be operated at any location, even those where other sources of electrical power are not readily available. The controller circuit 65 also provides charging and readiness indication via the indicator light(s) 14.

In order to use the device 10, a user plugs the appropriate adapter 20, 30, 40 connected to the charger body 11 into an available USB port (not shown), 12-volt accessory socket (not shown), or 110-volt outlet (not shown) if such are available, and places an electronic watch within the receptacle 12 of the body 11, while restraining it with the restraining strap 15. If the 12-volt outlet is "an always on" design, the watch will charge whether the vehicle ignition is on or off, which is convenient while the user is camping or performing other outdoor activities.

If the USB port or 12-volt accessory socket is in a non-horizontal orientation or significant vibration is expected, the user may position the restraining strap 15 around the electronic watch. With the addition of the restraining strap 15, the electronic watch can be secured to the body 11 so that the device 10 can be used in an all-terrain vehicle or snowmobile.

If a USB port (not shown), 12-volt accessory socket (not shown), or 110-volt outlet (not shown) are not available, the user can still utilize the device 10 (e.g., the USB ports 13 or the electronic watch receptacle 12) to charge an electronic device by use of the internal rechargeable battery 70. As the internal rechargeable battery 70 has a limited capacity, it must be recharged at a later time by connecting it an available USB port (not shown), 12-volt accessory socket (not shown), or 110-volt outlet (not shown) whereupon the internal rechargeable battery 70 is recharged allowing for future use.

A convenient recharging of an electronic watch is provided with the disclosed device 10, which supports both the electronic watch and strap. The electronic watch may be recharged at any time and in any location and in any orientation. The device 10 is compatible with almost any vehicle make and model, and the device 10 may work with a charging USB port, 12-volt socket or 110-volt outlet. This allows the device 10 to be able to charge an electronic watch during inactive times and to support the electronic watch. The device 10 is suitable for camping or recreation, may be compatible with all-terrain vehicles or snowmobiles, and is capable of both vertical and horizontal positioning. The exact specifications, materials used, and method of use of the device 10 may vary upon manufacturing.

The foregoing descriptions of specific embodiments have been presented for purposes of illustration and description. They are not intended to be exhaustive or to limit to the precise forms disclosed and many modifications and variations are possible in light of the above teachings. The embodiments were chosen and described in order to best explain principles and practical application to enable others skilled in the art to best utilize the various embodiments with various modifications as are suited to the particular use contemplated.

The invention claimed is:

1. An electronic watch charging device comprising:
   a body;
   a charging assembly configured to engage and inductively charge an electronic watch;
   an adapter mechanically coupled to said body and electrically coupled to said charging assembly, said adapter being configured to be coupled to a power supply;
   a restraining strap connected to said body, said restraining strap being configured to secure said electronic watch into engagement with said charging assembly receptacle.

2. The device of claim 1, wherein said charging assembly comprises:
   a charging receptacle; and
   a magnetic induction charger.

3. The device of claim 1, wherein said adapter comprises a USB adapter.

4. The device of claim 3, wherein said USB adapter comprises:
   a USB adapter plug configured to be coupled to a USB port of said power supply; and,
   a USB adapter connector configured to mechanically couple said USB adapter plug to said body and electrically couple said power supply to said charging assembly receptacle.

5. The device of claim 1, wherein said adapter comprises an accessory port adapter.

6. The device of claim 5, wherein said accessory port adapter comprises:
   an accessory port adapter plug configured to be coupled to a 12-volt DC socket of said power supply; and,
   an accessory port adapter connector configured to mechanically couple said accessory port adapter plug to said body and electrically couple said power supply to said charging assembly receptacle.

7. The device of claim 1, wherein said adapter comprises a standard plug adapter.

8. The device of claim 7, wherein said standard plug adapter comprises:
   a standard plug adapter plug configured to be coupled to a 110-volt AC outlet of said power supply; and,
   a standard plug adapter connector configured to mechanically couple said standard plug adapter plug to said body and electrically couple said power supply to said charging assembly receptacle.

9. The device of claim 1, further comprising an internal rechargeable battery disposed within said body and electrically coupled to said charging assembly receptacle.

10. The device of claim 9, wherein said adapter is electrically coupled to said internal rechargeable battery.

11. The device of claim 9, further comprising at least one USB port disposed in said body and electrically coupled to said internal rechargeable battery.

12. The device of claim 1, further comprising at least one USB port disposed in said body.

13. The device of claim 11, wherein said adapter is electrically coupled to said at least one USB port.

14. The device of claim 12, further comprising at least one indicator light configured to visually indicate that power is being supplied to said at least one USB port.

15. An electronic watch charging device comprising:
   a body;
   a charging assembly configured to engage and inductively charge an electronic watch;
   a restraining strap connected to said body, said restraining strap being configured to secure said electronic watch into engagement with said charging assembly receptacle;
   a USB adapter interchangeably coupled to said body, said USB adapter being configured to electrically interconnect said charging assembly receptacle to a power supply when coupled to said body;
   an accessory port adapter interchangeably coupled to said body, said accessory port adapter being configured to electrically interconnect said charging assembly receptacle to said power supply when coupled to said body; and,
   a standard plug adapter interchangeably coupled to said body, said standard plug adapter being configured to electrically interconnect said charging assembly receptacle to said power supply when coupled to said body.

16. The device of claim 15, further comprising:
   an internal rechargeable battery disposed within said body and electrically coupled to said charging assembly receptacle; and,
   at least one USB port disposed in said body and electrically coupled to said internal rechargeable battery.

17. The device of claim 16, wherein:
   said charging assembly comprises:
   a charging receptacle; and,
   a magnetic induction charger;

said USB adapter comprises:
  a USB adapter plug configured to be coupled to a USB port of said power supply; and,
  a USB adapter connector configured to mechanically couple said USB adapter plug to said body and electrically couple said power supply to said charging assembly receptacle, said internal rechargeable battery, and said at least one USB port;

said accessory port adapter comprises:
  an accessory port adapter plug configured to be coupled to a 12-volt DC socket of said power supply; and,
  an accessory port adapter connector configured to mechanically couple said accessory port adapter plug to said body and electrically couple said power supply to said charging assembly receptacle, said internal rechargeable battery, and said at least one USB port; and, said standard plug adapter comprises:
  a standard plug adapter plug configured to be coupled to a 110-volt AC outlet of said power supply; and,
  a standard plug adapter connector configured to mechanically couple said standard plug adapter plug to said body and electrically couple said power supply to said charging assembly receptacle, said internal rechargeable battery, and said at least one USB port.

18. The device of claim 17, wherein said charging receptacle is configured to support said induction charger, and wherein said induction charger is located on an exterior of said body within said charging receptacle.

19. The device of claim 17, wherein said charging receptacle is configured to support said electronic watch, and wherein said induction charger is located on an interior of said body below said charging receptacle.

\* \* \* \* \*